United States Patent Office 2,919,335
Patented Dec. 29, 1959

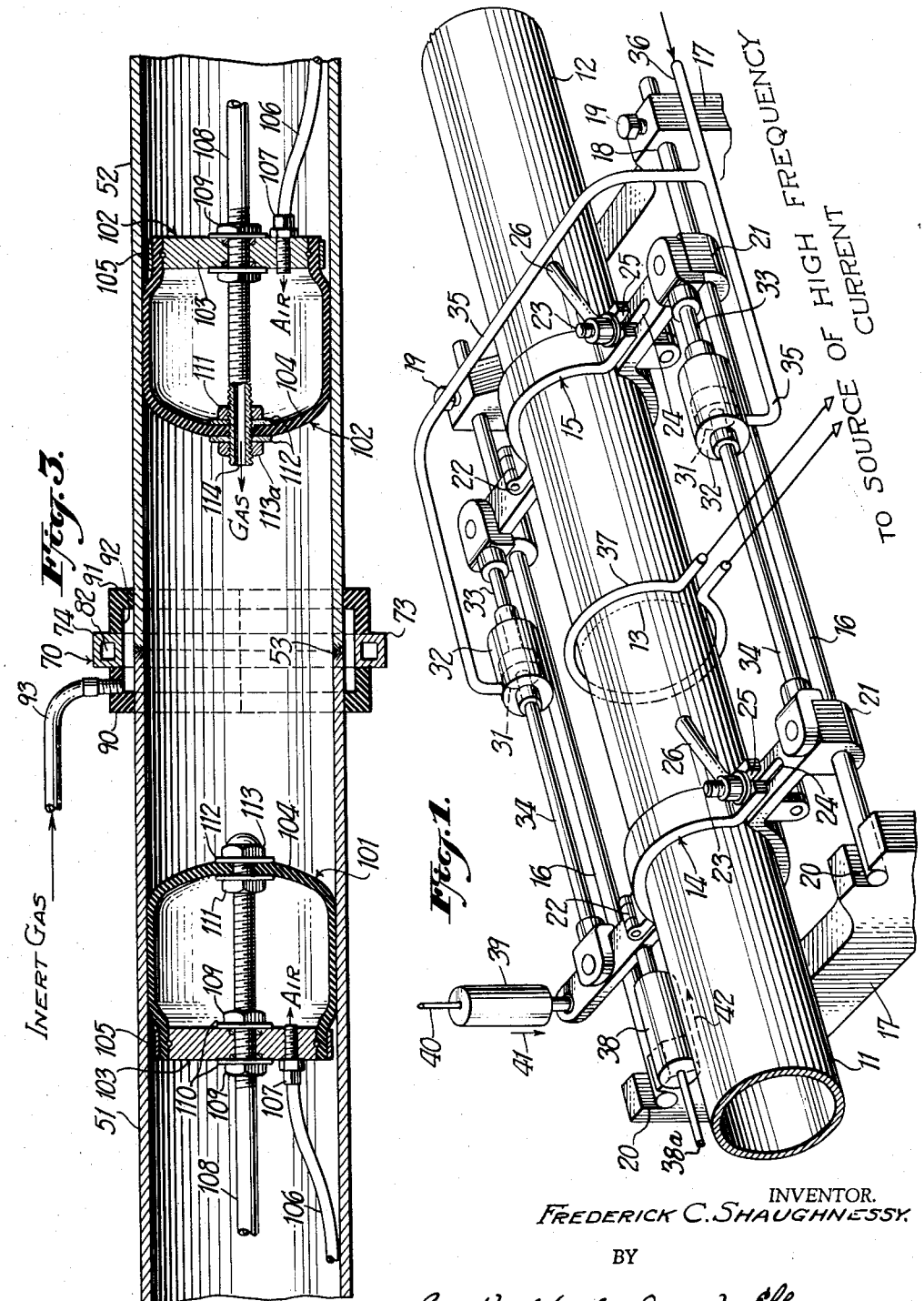

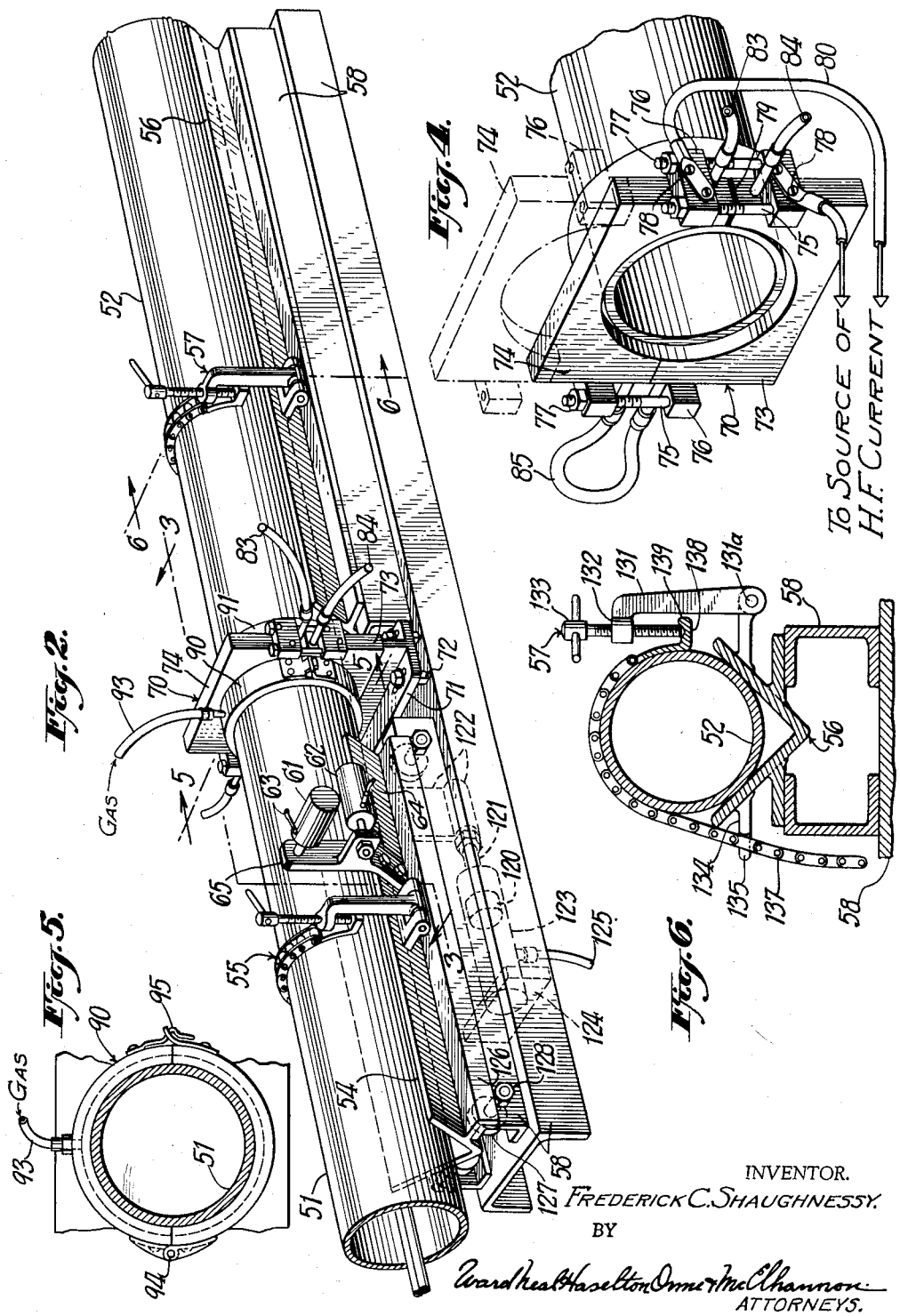

2,919,335

INDUCTION WELDING OF METALLIC PIPES

Frederick C. Shaughnessy, New York, N.Y., assignor to Consolidated Edison Company of New York, Inc., New York, N.Y., a corporation of New York Application March 31, 1958, Serial No. 725,158

12 Claims. (Cl. 219—9.5)

This invention relates to the welding of metal tubes and more particularly relates to butt welding of the ends of metal tubes by the use of high frequency electrical induction to heat the metal of the tube ends to welding temperature.

The usual methods used in the induction welding of metal pipes or tubes frequently lead to an undesirably high number of unsatisfactory welds being produced when usual butt pressure is applied at the facing ends of the two sections of pipe being welded while the pipe ends are heated to welding temperature by means of induced alternating current. The usual technique requires extremely critical control of the pipe temperatures at the weld point and a very critical application of pressure to the weld in order to insure complete fusing of the two metal surfaces and yet prevent extruding of metal internally and externally at the weld joint.

With the present invention, the above noted difficulties are substantially eliminated by the use of butt welding apparatus which includes means for holding the tube ends in aligned axial relation, induction heating means for heating the tube ends to welding temperatures, constant pressure means for pressing the tube ends together and vibrating means for vibrating the tube ends during the welding process. It has been found that excellent weld joints can be obtained with the apparatus of the invention and it has been found to be particularly important, in obtaining good joints without internal or external extrusion of metal at the joint, to press the ends of the tubes or pipes together with constant pressure and to subject at least one of such tubes or pipes to vibration either in a direction normal to the faces of the ends to be welded or in a direction transverse to the axes of the tubes during heating to fusing temperature and cooling of the ends.

Other and more specific objects, features and advantages of the invention will appear from the detailed description given below taken in connection with the accompanying drawings which illustrate by way of example the presently preferred embodiments of the invention.

In the drawings:

Figure 1 is a perspective view showing an arrangement of apparatus constructed in accordance with the invention;

Figure 2 is a perspective view showing another arrangement of apparatus constructed in accordance with the invention;

Figure 3 is a partial longitudinal sectional view taken along line 3—3 of Fig. 2;

Figure 4 is a partial perspective view showing in greater detail a portion of the apparatus shown in Fig. 2;

Figure 5 is a partial sectional view taken along line 5—5 of Fig. 2; and

Figure 6 is a sectional view taken along line 6—6 of Fig. 2.

Referring to Fig. 1, two metal pipes 11 and 12 are shown aligned so that their abutting ends, which have been machined, form a joint 13 at which butt welding of the two pipes takes place. Pipes 11 and 12 may be held in place by any suitable means, shown here as clamps 14 and 15 which are supported and guided by guide rods 16 which in turn are supported by a base 17. The guide rods 16 pass through holes 18 in one end of base 17 and are secured therein by set screws 19. The other ends of the guide rods 16 rest in depressions 20 formed in the other end of the base 17. Guide rods 16 pass through lugs 21 which are carried on the clamps 14 and 15, thereby maintaining the axial alignment of the pipes and clamps while permitting longitudinal movement of the pipes 11 and 12 with respect to each other. The clamps 14 and 15 are hinged at 22 and carry swing bolts 23 which cooperate with slots 24 and 25 to enable the clamps 14 and 15 to be clamped tightly about the pipes 11 and 12 by the use of handle nuts 26.

Longitudinal movement of the pipes 11 and 12 with respect to each other may be controlled by means of hydraulic pistons 31 moving within cylinders 32. As shown in Fig. 1, the cylinders 32 are connected to clamp 15 by rods 33 while the pistons 31 are connected to clamp 14 by rods 34. Hydraulic fluid under pressure may be supplied to the cylinders 31 through conduits 35 from a common source, such as a conduit 36, or from separate sources. This hydraulic system is preferably used to press the abutting ends of pipes 11 and 12 together under substantially constant pressure during the welding process. Such pressure is preferably maintained continuously while the abutting ends of the pipes are heated to welding temperature and also during a cooling period following fusion of the ends of the pipe to form the desired weld joint.

The abutting ends of the pipes 11 and 12 are heated to welding temperatures by suitable induction heating means shown in Fig. 1 as a single turn induction coil 37 connected to a high frequency alternating current source (not shown). The induction coil 37 may be a water-cooled coil similar to the one described below in connection with Figs. 2–6.

Inertia vibrating means shown here as a vibrator 38 is provided for vibrating the pipe 11 in a direction normal to the faces of the abutting ends forming joint 13. Vibrator 38, which may be supported in any well known manner, is similar in construction to the ordinary vibrating pneumatic hammer mechanism and is secured to clamp 14 as shown in Fig. 1 in such a way that the vibrating mechanism within the vibrator 38 acts in a longitudinal direction with respect to pipe 11, thus vibrating the joint 13 in a direction indicated by an arrow 42 and normal to the faces of the abutting pipe ends. Compressed air for operating the vibrating mechanism may be supplied to the vibrator 38 through a conduit 38a.

Means for inertia vibrating the pipe 11 in a direction transverse to the axes of the pipes and substantially parallel to a line tangent to the circumference of the pipe 11 may be provided in the form of a vibrator 39 which may be supported in any well known manner and which is secured to the clamp 14 as shown in Fig. 1. The vibrator 39 is similar to the vibrator 38 and may be supplied with compressed air through a conduit 40. Vibrator 39 may be used alone or may be used simultaneously with vibrator 38 so as to vibrate pipe 11 at the joint 13 either in a direction normal to the faces of the abutting pipe ends or in a direction transverse to the axes of the pipes or both during the welding process. The clearance between the clamps 14 and 15 and the guide rods 16 described above is preferably such that the clamp 14 has sufficient play to transmit the tangential vibration produced by the vibrator 39 in the direction indicated by an arrow 41 to the pipe 11 and the clamp 15 holds the pipe 12 immobile so that the pipe 11 is vibrated with respect to the pipe 12. Likewise, the clearance between the clamp 14 and the guide rods 16 permits sufficient play so that the vibrations imparted in the direction indicated by the arrow 41 may be transmitted to the pipe 11 without substantial movement of the guide rods 16 with respect to the recesses 20 in the base 17. In this connection, it has been found that vibration of the pipes through only a small fraction of an inch will provide the desired weld point.

With reference to Figs. 2–6, apparatus is shown for butt welding a pipe 51 to a pipe 52 along a joint 53 formed by the abutting ends of the pipes 51 and 52. The pipes 51 and 52 may be held in the desired positions by any suitable means and as shown in Fig. 2, the pipe 51 may be secured to a base member 54 by a clamp 55 while the pipe 52 may be secured to a base member 56 by a clamp 57. The base member 56 is in turn secured to a base 58 while the base member 54 rests on the base 58 and is free to move longitudinally with respect to the base 58 while being restrained from lateral movement with respect thereto as described below.

As shown in Fig. 2, inertia vibrating means, shown here as vibrators 61 and 62, are provided for vibrating the pipe 51 during the welding process. The vibrators 61 and 62 may be similar in construction to ordinary vibrating pneumatic hammer mechanisms and hence, may be the same as the vibrators 41 and 38. Compressed air for operating the vibrators 61 and 62 may be supplied through conduits 63 and 64. The vibrator 61 is mounted on a bracket 65 which is rigidly fixed to the base 54 in such a way as to vibrate the pipe 51 in a direction transverse to its axis and substantially parallel to a line tangent to the circumference of the pipe 51 while vibrator 62 is mounted on bracket 65 in such a way as to vibrate the pipe 51 in a longitudinal direction normal to the faces of the abutting ends of pipes 51 and 52. The vibrators 61 and 62 may be used simultaneously or either one alone may be used as desired. Vibration of the pipe 51 in the manner described is preferably carried out during the period in which the abutting pipe ends are being heated to welding temperature as described below as well as during the actual fusion of such ends and during the cooling period following such fusion.

The abutting ends of the pipes 51 and 52 are heated to welding temperature by induction heating means shown in Figs. 2 and 4 as a single turn, water-cooled induction coil 70 comprising an upper half 74 and a lower half 73. As shown in Fig. 2, the lower half 73 of coil 70 may be mounted on the base 58 by means of a mounting bracket 71 secured to the base 58 by suitable means such as bolts 72. The two halves of coil 70 surround the joint 53 formed by the abutting ends of pipes 51 and 52 but do not make electrical contact with the pipes. This may be accomplished by mounting the lower half of 73 of coil 70 on mounting bracket 71 as described above and then detachably securing the upper half 74 of the coil 70 to the lower half 73 by means of bolts such as 75 passing through insulating blocks 76 and secured by nuts 77. The insulating blocks 76 are fastened to the upper and lower halves of coil 70 by any suitable means such as screws 78.

The coil 70 should be electrically interrupted at some point such as by a layer of insulation 79, shown in Fig. 4 at one of the junctions between the two halves of the coil. High frequency alternating current may then be supplied to the coil through cables 80 and 81 which are electrically connected to the coil 70 on opposite sides of the insulation 79 as by connecting the cables to the screws 78 as shown in Fig. 4.

The coil 70 is preferably constructed so as to include a central annular passage 82 (Fig. 3) through which water or any other suitable cooling medium may be passed to prevent overheating of the coil 70. The cooling medium may be supplied to the coil through a conduit 83 and withdrawn through a conduit 84 as shown in Fig. 4. Since circulation of the water throughout both halves 73 and 74 the coil 70 should be provided while at the same time the halves of the coil 70 should be easily separable, each half of the coil includes a separate section of the annular passage 82, and the sections are interconnected by a flexible tube 85 to allow water to pass from one half of the coil to the other. When it is desired to separate the two halves of coil 70 as for placing pipes in the apparatus prior to welding or for removing welded pipes, it is only necessary to remove the nuts 77 and the upper half 74 of the coil may then be raised as shown in Fig. 4 by dotted lines. The bottom half 73 of the coil 70 may remain secured to the mounting bracket 71 during insertion of pipes in the apparatus or removal of pipes therefrom. Since the clearance of the coil 70 around the circumference of the pipes 51 and 52 in the apparatus is determined by the positioning of the bottom half of the coil, it is not necessary to readjust the position of the coil to secure proper clearance around the pipes each time different sections of pipe are placed in the apparatus for welding.

In order to minimize oxidation of the metal during the welding operation, it is preferable to bathe both the interior and exterior surfaces of the abutting ends of pipes 51 and 52 in an atmosphere of a non-oxidizing gas, such as argon, or other inert gas. As shown in Figs. 2, 3 and 5, a housing may be provided around the exterior of the abutting ends of pipes 51 and 52 which includes split retaining rings 90 and 91 made of electrically insulating, heat resisting material. As best shown in Fig. 3, the retaining rings 90 and 91 fit tightly around the circumferences of pipes 51 and 52, respectively, and cooperate with the induction coil 70 to provide an annular space 92 surrounding the abutting ends of pipes 51 and 52 into which inert gas may be passed through a conduit 93 to provide the desired non-oxidizing atmosphere around the exterior of the abutting pipe ends during the welding thereof. As best shown in Fig. 5, each of the retaining rings 90 and 91 comprise two halves which are hinged, as at 94, and detachably secured, as by a catch 95, to insure a tight fit around the circumference of the pipes.

As shown in Fig. 3, fluid pressure expansible means such as back stoppers 101 and 102 may be provided for sealing the interior of each of the pipes 51 and 52 adjacent the abutting ends thereof to prevent substantial escape of gas through the pipes. The use of such fluid pressure expansible means is preferred since the interior as well as the exterior of the abutting pipe ends may then be bathed with a non-oxidizing gas in order to prevent oxidation of the metal during the welding operation.

Each of the back stoppers 101 and 102 includes a circular base member 103 and a fluid pressure expansible bladder 104, made of rubber, for example, which is secured to the periphery of the base member 103 by any suitable means such as a clamp 105 and into which fluid, such as air under pressure, may be admitted through a conduit 106 connected to the base member 103 by a fitting 107. The back stoppers 101 and 102 are carried on stems 108 having threaded ends which pass through the base members 103 and are secured thereto by nuts 109 and washers 110. The threaded ends of the stems 108 also project through the bladders 104 to which they are secured by nuts 111, washers 112 and nuts 113. The stems 108 serve as a means for positioning the back stoppers 101 and 102 in the pipes 51 and 52 and may also be hollow to provide a convenient means for introducing a non-oxidizing gas, such as argon, into the pipes 51 and 52 adjacent the joint 53. If it is desired to utilize the stems 108 for introducing inert gas in this manner, an ordinary nut 113a, rather than a cap nut 113 may be employed to allow such gas to escape from the stem 108.

From Fig. 3 it can be seen that since the base members 103 are considerably smaller in diameter than the internal diameter of the pipes 51 and 52, the back stoppers 101 and 102 may be readily inserted into the pipes when the bladders 104 are in a collapsed condition. The bladders 104 are constructed of any suitable flexible material such as rubber or laminations of rubber and fabric so that when fluid under pressure is introduced into the bladders through the conduits 106 the bladders expand to the configuration shown in Fig. 3 and thereby cut off the flow of gas through the interiors of the pipes 51 and 52 past the bladders.

Referring to Fig. 2, means are shown for pressing the abutting ends of pipes 51 and 52 together which in this embodiment of the invention comprise a hydraulic piston 120 which is secured, as by a rod 121 and a bracket 122, to the base member 54. The piston 120 operates in a hydraulic cylinder 123 which is secured by means of a block 124 to the base member 58. Hydraulic fluid under pressure may be introduced to the cylinder 123 through a conduit 125. Guide members 126 which are fastened to the base member 54, as by welding, guide the base 54 with respect to the base 58. The base 54 is free to move longitudinally with respect to the base 58 and, for this purpose, may be supported from the base 58 on rollers such as 127 mounted on axles 128 which are journaled in base 58 as shown. With the base 54 free to move longitudinally with very little friction against the base 58, the pressure with which the abutting ends of pipes 51 and 52 are pressed together during the welding process can be controlled within quite close limits by controlling the amount of pressure maintained in cylinder 123. This hydraulic pressure as well as the vibrating described above is preferably continued during the heating of the ends of the pipes to welding temperature as well as during a subsequent cooling period.

Fig. 6 illustrates in greater detail the manner in which the pipes 51 and 52 may be clamped to the base members 54 and 56 by means of clamps such as 57. As shown in Fig. 6, clamp 57, which is similar to clamp 55, includes a bracket member 131, the lower portion of which is fastened to the base member 56, as by welding, the upper portion of member 131 being pivotally connected to the lower portion at 131a and being adapted to receive, in a threaded portion 132, a threaded tightening screw 133. On the side of the base member 56 opposite the bracket member 131 a projecting member 134 is provided which has a sprocket 135 on its end adapted to engage the links of a chain 137 which may be passed over the pipe 52 as shown in Fig. 6. One end of the chain 137 is provided with an end fitting 138 having a recess 139 adapted to receive the end of the tightening handle 133. To secure the pipe 52 firmly in place on the base 56, it is necessary only to engage the tightening screw 133 in the recess 139 of the chain 137 and engage a link of the chain on the sprocket 135 as shown in Fig. 6. Then, by forcing the end of the tightening handle 57 down against the end portion 138 of the chain, by turning the screw 133, the pipe 52 may be pressed against the base 56 with any desired force limited only by the structural strength of the parts. This arrangement combined with the use of a V-shaped base member as shown serves the dual purpose of providing axial alignment for the pipe at the same time preventing longitudinal movement of the pipe with respect to the base member 56.

While the invention has been described in detail with respect to certain preferred embodiments, it will be understood by those skilled in the art that various changes and modifications may be made without departing from the spirit and scope of the invention and it is intended to cover all such changes and modifications in the appended claims.

I claim:

1. Apparatus for butt welding the ends of metal tubes comprising in combination induction heating means for heating said tube ends to welding temperatures, means for pressing said tube ends together, and vibrating means for vibrating said tube ends during the welding thereof.

2. Apparatus for butt welding the ends of metal tubes comprising in combination means for holding said tube ends in abutting relation, induction heating means for heating said tube ends to welding temperature, constant pressure means for urging said tube ends together under constant pressure during welding, and vibrating means for vibrating said tube ends during the welding thereof.

3. Apparatus for butt welding the ends of metal tubes comprising in combination means for holding said tubes in aligned axial relation, induction heating means for heating tube ends to welding temperature, constant pressure means for pressing said tube ends together under constant pressure during welding, and vibrating means for vibrating at least one of said tubes normally to the faces of said tube ends.

4. Apparatus for butt welding the ends of metal tubes comprising in combination means for holding said tubes in aligned axial relation, induction heating means for heating said tube ends to welding temperature, constant pressure means for urging said tube ends together under constant pressure during welding, and vibrating means for vibrating one of said tubes with respect to the other in a direction substantially parallel to a line tangent to the circumference of said tubes.

5. Apparatus for butt welding ends of metal tubes comprising in combination means for holding said tubes in aligned axial relation, induction heating means for heating said tube ends to welding temperature, constant pressure means for urging said tube ends together under constant pressure during welding, and vibrating means for vibrating at least one of said tubes in a direction normal to the faces of said tube ends while simultaneously vibrating one of said tube ends with respect to the other in a direction substantially parallel to a line tangent to the circumference of said tube ends.

6. Apparatus for butt welding the ends of metal tubes comprising in combination means for holding said tubes in aligned axial relation, induction heating means for heating said tube ends to welding temperature, constant pressure means for urging said tube ends together under constant pressure during welding, vibrating means for vibrating at least one of said tube ends, fluid pressure expansible means for sealing the interior of each of said tubes adjacent said tube ends to prevent substantial escape of gas through said tubes, and means for bathing the interior of said tube ends with a non-oxidizing gas.

7. Apparatus for butt welding the ends of metal tubes comprising in combination means for holding said tubes in aligned axial relation, induction heating means for heating said tube ends to welding temperature, constant pressure means for urging said tube ends together under constant pressure during welding, vibrating means for vibrating at least one of said tube ends, fluid pressure expansible means for sealing the interior of each of said tubes adjacent said tube ends to prevent substantial escape of gas through said tubes, means for bathing the interior of said tube ends with a non-oxidizing gas, a housing surrounding said tube ends, and means for filling said housing with a non-oxidizing gas.

8. Welding apparatus of the character described comprising in combination means for holding the abutting ends of metal tubes in axial alignment, an induction coil for heating said ends to welding temperature and adapted to extend around said ends, constant pressure hydraulic means for urging said ends together, a first inertial vibrator adapted to vibrate one of said tubes in a direction normal to the faces of said ends, a second inertial vibrator adapted to vibrate one of said tubes in a direction substantially parallel to a line tangent to the circumference of said ends, fluid pressure expansible means adapted to seal the interior of each of said tubes adjacent said ends to prevent substantial escape of gas through said tubes, said fluid pressure expansible means including means by which a non-oxidizing gas may be introduced to the interior of said tube ends, a housing surrounding said tube ends and cooperating with said induction coil to prevent substantial escape of gas from the exterior of said tube ends, and means for introducing a non-oxidizing gas into the space enclosed by said housing and said induction coil exterior of said tube ends.

9. The process for butt welding the ends of metal tubes which comprises pressing said ends together with a substantially constant pressure while simultaneously heating said ends by induction to welding temperature and vibrating at least one of said tubes in a predetermined direction.

10. The process for butt welding the ends of metal tubes which comprises pressing said tube ends together with a subtsantially constant pressure, heating said ends to welding temperature by induction while simultaneously vibrating at least one of said tubes normally to the faces of said tube ends, and subsequently maintaining said pressure and continuing said vibrating while cooling said ends.

11. The process for butt welding the ends of metal tubes which comprises pressing said tube ends together with a substantially constant pressure, heating said ends to welding temperature by induction while simultaneously vibrating one of said tubes with respect to the other in a direction substantially parallel to a line tangent to the circumference of said tubes, and subsequently maintaining said pressure and continuing said vibrating while cooling said ends.

12. The process for butt welding the ends of metal tubes which comprises pressing said tube ends together with a substantially constant pressure, while heating said ends to welding temperature by induction and simultaneously vibrating at least one of said tubes in a direction normal to the faces of said tube ends and vibrating one of said tube ends with respect to the other tube end in a direction substantially parallel to a line tangent to the circumference of said tube ends.

References Cited in the file of this patent

UNITED STATES PATENTS

| | | |
|---|---|---|
| 2,542,393 | Chapman | Feb. 20, 1951 |
| 2,649,527 | Chapman et al. | Aug. 18, 1953 |
| 2,802,092 | Hauck | Aug. 6, 1957 |

FOREIGN PATENTS

| | | |
|---|---|---|
| 251,946 | Switzerland | Sept. 1, 1948 |